United States Patent

[11] 3,618,680

| [72] | Inventors | Joe D. Ellard<br>Lafayette, La.;<br>Lee Bone, Richardson, Tex. |
|---|---|---|
| [21] | Appl. No. | 37,860 |
| [22] | Filed | May 15, 1970 |
| [45] | Patented | Nov. 9, 1971 |
| [73] | Assignee | Atlantic Richfield Company<br>New York, N.Y. |

[54] METHOD FOR DRILLING IN PERMAFROST
8 Claims, No Drawings

[52] U.S. Cl. .................................................. 175/17,
166/DIG. 1, 252/8.5 M
[51] Int. Cl. ......................................................... E21b 21/00
[50] Field of Search ............................................ 166/DIG. 1;
175/17, 65; 252/8.5 M, 8.5 A

[56] References Cited
UNITED STATES PATENTS

| 2,193,219 | 3/1940 | Bowie et al. .................. | 175/17 |
|---|---|---|---|
| 2,830,948 | 4/1958 | Popham ....................... | 252/8.5 M |
| 3,085,976 | 4/1963 | Phansalkar et al............. | 252/8.5 M |
| 2,995,514 | 8/1961 | Jordan et al. .................. | 252/8.5 M |
| 2,109,337 | 2/1938 | Mayfield ....................... | 252/8.5 A |
| 2,055,666 | 9/1936 | Moore et al. .................. | 252/8.5 M |
| 3,168,475 | 2/1965 | Jordan et al. .................. | 252/8.5 M |
| 3,179,528 | 4/1965 | Holmgren et al. ............. | 166/DIG.1 |

OTHER REFERENCES

Petroleum Abstracts, No. 55,791, June 19, 1965. (copy in 166–DIG. 1)

Uren, L. C., Petroleum Production Engineering: Oil Field Development, N.Y., McGraw-Hill 1956, p. 279 (copy in Group 350)

*Primary Examiner*—Ian A. Calvert
*Attorneys*—Blucher S. Tharp and Roderick W. MacDonald ABSTRACT: A method for drilling a well bore through a permafrost zone and a drilling fluid for use in that method wherein the drilling fluid contains oil, limited amounts of asbestos and/or silica, a limited tolerable amount of water, and the drilling fluid is cooled before use in the drilling method.

METHOD FOR DRILLING IN PERMAFROST

BACKGROUND OF THE INVENTION

Heretofore oil base drilling fluids have been employed which contain at least 5 pounds per barrel of asbestos, U.S. Pat. No. 2,995,514.

Normally, oil base drilling fluids contain some water, e.g. 5 vol. percent water, together with an emulsifier to form a water-in-oil emulsion, U.S. Pat. No. 2,995,514, Column 2. The emulsion is desired because it gives increased viscosity for the drilling fluid and improved fluid loss control.

These drilling fluids have been employed in conventional wells where drilling is carried out through unfrozen earth, gravel, rock, and the like.

In areas such as the Far North Country where either continuous or discontinuous permafrost is present in the earth and the wellbore is to be drilled through a permafrost zone, the above prior art drilling fluids and methods must be altered in order to avoid thawing of the permafrost with a consequent sloughing of permafrost material into the well bore, and to prevent disruption and penetration of the permafrost with a consequent drilling fluid loss.

Further, careful control has to be made of the temperature in the well bore because sloughing of permafrost material into the well bore can be encountered when too cold a drilling fluid is employed as well as when too warm a drilling fluid is employed.

SUMMARY OF THE INVENTION

According to this invention there is provided a drilling fluid which consists essentially of oil containing a minor but effective viscosifying amount not exceeding 4.5 pounds per barrel of at least one of subdivided asbestos and subdivided silica, the drilling fluid containing substantially no water.

According to the method of this invention a well bore is drilled through a permafrost zone wherein the improvement comprises employing the above oil base drilling fluid but before using the drilling fluid in the drilling method, cooling the drilling fluid to a temperature below about 27° F. but not below that temperature at which sloughing of permafrost occurs due to contraction of the permafrost.

By utilizing asbestos and/or silica in minor amounts not exceeding 4.5 pounds per barrel of drilling fluid, sufficient viscosity is obtained to lift drilling cuttings out of the well bore in the normal manner. At the same time, however, the viscosity of the drilling fluid is sufficiently low that the back pressure that is built-up when the bore hole is filled with drilling fluid is not sufficient to cause fracturing of the permafrost and consequent undesired loss of drilling fluid into the permafrost.

By substantially eliminating water from the drilling fluid, this invention goes contrary to prior art teachings of using a water-in-oil emulsion for improved viscosity and fluid loss control. However, at the same time, the drilling fluid of this invention is made more amenable to use, storage, and transportation in Arctic areas. The drilling fluid of this invention can be stored or otherwise allowed to sit at extremely cold temperatures without concern for the drilling fluid freezing and without requiring the use of freezing point depressing additive and the like.

By utilizing the drilling fluid of this invention in a precooled state as set forth above and as described in greater detail hereinafter, sloughing of permafrost material is avoided due either to melting of the permafrost material or subcooling of the permafrost material. Subcooling of the permafrost can cause freezing of liquid water present in the permafrost and sloughing due to the freezing and expansion of this water and at the same time the contraction of other earthen material present.

Additionally, the drilling fluid of this invention has thermal-insulation qualities which make it advantageous to leave drilling fluid in the well annulus after the well has been drilled and completed. The fluid then functions as a packer fluid and acts as insulation for preventing melting of the permafrost adjacent the well bore.

Accordingly, it is an object of this invention to provide a new and improved method for drilling a well bore through a permafrost zone. Another object is to provide a new and improved method for drilling a well in areas of permafrost in a manner which avoids the sloughing of permafrost material into the well bore due to either thawing of the permafrost or subcooling of the permafrost.

Other aspects, objects, and advantages of this invention will be apparent to those skilled in the art from this disclosure and the appended claims.

DETAILED DESCRIPTION OF THE INVENTION

According to this invention there is provided a drilling fluid which consists essentially of (1) a minor but effective viscosifying amount not exceeding 4.5 pounds per barrel of drilling fluid, preferably from about 1 to 4.5 pounds per barrel of drilling fluid, of one of subdivided asbestos, subdivided silica, and mixtures thereof; (2) substantially no water; and (3) the remainder of the drilling fluid being essentially one or more oils.

The drilling fluid can additionally contain a minor but effective dispersing amount of at least one dispersing agent for the asbestos and/or silica.

The oil base for the drilling fluid can be any oil normally used in the industry for oil base drilling fluids and is generally a petroleum oil. Such oils include crude oil; partially fractionated crude oil; refined or partially refined products of crude oil such as fuel oil, diesel oil, kerosene, stove oil; and the like. Of course, mixtures of such oils can be employed. The oil base should have an ASTM Pour Point, 1967 revision, D-97-66, of less than 0° F.

The oil constitutes the predominate material of the drilling fluid but a very important minor amount of asbestos and/or silica is necessary in order to attain a drilling cuttings lifting capability without producing so much pressure in the borehole with the drilling fluid as to cause fracturing of the permafrost. Thus, carefully controlled amounts of these materials according to the teachings of this invention should be employed.

The asbestos employed can comprise one or more of any of the known species of that mineral, i.e., chrysolite amosite, anthophyllite, crocidolite, tremolite, actinolite, and mixtures thereof. The asbestos is preferably employed in a subdivided form and preferably substantially all passes a 16 mesh sieve (U.S. Standard). By "substantially all" it is meant that at least about 90 weight percent of the asbestos will pass through the 16 mesh sieve. Thus, a minor amount of the asbestos can be larger than 16 mesh sieve size and the asbestos still be within the scope of this invention.

Substantially any silica can be employed and it also is preferably employed in a subdivided form, e.g., substantially all passing a 325 mesh sieve (U.S. Standard). Here again, as with the asbestos, a minor amount, e.g., up to about 10 weight percent of the silica, can be larger than 1325 mesh sieve size and still be within the scope of this invention.

The drilling fluid should also be substantially water-free and generally should contain no more than about 1 volume percent water based on the total weight of the drilling fluid.

The drilling fluid is prepared by simply mixing the asbestos and/or silica with the oil base until there is provided a homogeneous mixture thereof.

If desired, the drilling fluid can additionally contain a minor but effective dispersing amount of at least one dispersing agent for the asbestos and/or silica to help maintain the homogeneous mixture after the mixing procedure and to help prevent settling of asbestos and/or silica from the mixture during storage or use. An extremely large number of materials are known in the art and available for such use. Suitable materials include surface active agents characterized by long hydrocarbon chains such as linear or branched alkyl radicals of at least eight carbon atoms, an abietic group, a "keryl" radical obtained from kerosene, etc., attached to a hydrophilic group such as a carboxyl radical, sulfate radical, sulfonate radical, polyoxyethylene group, or a cationic group such as an ammonium ion or quaternary ammonium ion. A full and complete disclosure of these materials can be found in "Surface Active Agents," Schwartz and Perry, New York, New York, 1949.

Where the material contains a carboxyl or sulfate radical, this can be neutralized with an alkali metal or alkaline earth metal cation or a short chain amine or alkanol amine such as sodium, potassium, calcium, magnesium methyl-ammonium, or triethanolammonium. Where the material is of the cationic type, it can be used in salt form, the anion being derived from a mineral acid or an organic acid such as acetic or propionic acid. Thus, the cationic material will be in the form of a salt such as a halide (chloride), nitrate, sulfate, acetate, and the like.

A large number of other materials can be employed such as conventional fatty acid soaps, e.g., sodium, potassium, calcium, or trimethylammonium laurates, oleates, palmitates, stearates, and the like.

Rosin soaps obtained by the saponification of rosin with an alkali can also be used, e.g., sodium rosinate.

Tall oil soaps, particularly of alkali metals can also be used.

Other suitable materials include sulfonated fatty acids and alkali metal salts of sulfated castor oil.

Alkaline earth metal soaps of the above materials can also be employed.

Still other suitable materials include long chain alkyl ethers of polyethylene glycol, the chain having at least eight carbon atoms and being either directly attached to the polyethylene glycol or attached by means of an intermediate phenyl group. Such materials include the nonylphenyl ether of polyethylene glycol wherein the polyethylene chain contains nine ethyoxy groups.

Still other materials include lauryl ammonium acetate, dioctadecyldimethylammonium chloride, octadecyltrimethylammonium bromide, abietyl ammonium acetate, alkylbenzyltrimethyl ammonium halides, and the like.

As can be seen from the above a large number of materials are applicable and substantially any material or mixture of materials can be used which is effective for dispersing the asbestos and/or silica in the oil base and which is substantially inert to the asbestos and/or silica as well as the oil base.

The dispersing material can be mixed into the oil base in the same manner in which the asbestos and/or silica are mixed therein and can actually be mixed into the oil base before, during, and/or after the addition of the asbestos and/or silica.

All mixing procedures set forth hereinabove can be carried out at ambient conditions of temperature and pressure or at elevated temperatures and/or pressures as desired so long as decomposition of the oil base, dispersing agent, and the like is not effected.

The drilling method of this invention employs conventional drilling steps with the improvement comprising using the oil base drilling fluid described hereinabove in conventional drilling quantities and, before using the drilling fluid in the drilling method, cooling the drilling fluid to a temperature below about 27° F. but not below that temperature at which sloughing of permafrost materials occurs due to subcooling of the permafrost. Sloughing of the permafrost can be caused by heating same to a temperature which causes thawing of the ice in the permafrost thereby allowing unconsolidated gravel, sand, and the like to fall into the well bore. Simply cooling the drilling fluid to a temperature substantially at or below the freezing point of water does not completely eliminate the sloughing problem because there can be free water present in the permafrost and freezing of this water can also cause sloughing of frozen permafrost into the well bore. Thus, the temperature of the drilling fluid should not be below that temperature which causes substantial freezing of free water in the permafrost.

The prevention of sloughing of permafrost by either superheating or subcooling of same is extremely important. For example, whenever drilling is temporarily stopped and the drill pipe removed from the well bore, e.g., to change drilling bits, large amounts of the walls of the well bore can slough into the well bore thereby partially filling the well bore after it has been drilled. As much as several hundred feet of the well bore can be refilled with this sloughed material at any time that the drill pipe is removed from the well bore. This necessitates redrilling a very large proportion of the well bore since the drill pipe is frequently removed from the well bore during the drilling of the well. Thus, the prevention of sloughing of permafrost can take many days and even weeks off the time required to drill a well.

The particular temperature below which the drilling fluid should not be cooled to prevent subcooling of the permafrost will vary widely depending upon the composition of the permafrost itself and other conditions which can vary from well bore to well bore. However, generally, the drilling fluid is preferably cooled to below about 27° F. but not below about 0° F. before use in the drilling method.

EXAMPLE

A permafrost model was formed from a frozen mixture of ice, gravel, and bentonite clay. The frozen mixture was in a cylindrical form 2½ feet long, with a 6 inch outer diameter and a 1 inch inner diameter thereby leaving a 2½-inch wall thickness of permafrost.

Various drilling fluids were passed through the 1 inch inner diameter hole to test the melting capacity of the drilling fluid for the permafrost at various temperatures. The temperatures of the drilling fluids were varied between tests.

Water containing from 18 weight percent to 22 weight percent sodium chloride was tested at +10° F. and water containing 20 and 28 weight percent calcium chloride was tested at +10° F. and −30° F., respectively. It was found that for each of these fluids the permafrost model was so badly dissolved that loss of circulation occurred at circulation times of from about 30 seconds to about 1½ minutes.

On the other hand, jet fuel JP-4, API gravity 45 to 47, and Arctic diesel fuel, API gravity 42.10, could each be circulated through the permafrost model for 122 hours with no indication of any detrimental thawing of the permafrost and with all evidence pointing toward an ability to circulate indefinitely without damage to the permafrost.

The mixing of asbestos or silica into the oil base in amounts of about 4 pounds per barrel of drilling fluid does not affect the nondissolving characteristic of the oil bases tested but does increase the viscosity of the oil base so that drilling cuttings can be lifted out of the borehole.

In the tests, substantially all of the asbestos was subdivided so as to pass a 16 mesh sieve (U.S. Standard Sieve Series) and the silica was fumed silica having a subdivision such that the average particle diameter was from about 70 to about 500 Angstroms.

In the tests using 4 pounds of asbestos per barrel of drilling fluid and an oil base of Arctic diesel fuel having an API gravity of 42.10 and a pour point of −55° F., the yield point (pounds per 100 square feet, API Standard Procedure, API Bulletin RP 13B, 1st Edition, Nov., 1962 ) of the diesel oil with asbestos dispersed therein was 8 and at 95° F. varied from 26 at 2° F. down to 18 at 62° F. Thus, since yield point values indicate the ability of a drilling fluid to lift particles out of a borehole, the yield points achieved, particularly at lower temperatures, indicate a capability of the drilling fluid of this invention to lift cuttings from a borehole.

Reasonable variations and modifications are possible within the scope of this disclosure without departing from the spirit and scope of this invention.

The embodiments of the invention in which an exclusive property or privilege is claimed are defined as follows:

1. In a method for drilling a well bore through a permafrost zone, the improvement comprising employing an oil base drilling fluid consisting essentially of 1. a minor but effective viscosifying amount not exceeding 4.5 pounds per barrel of at least one of subdivided asbestos and subdivided silica, 2. substantially no water,
3. the remainder being essentially oil, and before using said drilling fluid in said drilling method cooling said drilling fluid to a temperature below about 27° F. but not below that temperature at which sloughing of permafrost occurs due to subcooling.

2. A method according to claim 1 wherein said drilling fluid is cooled to below about 27° F. but not below about 0° F. before use in the drilling method.

3. A method according to claim 1 wherein said drilling fluid additionally contains a minor but effective dispersing amount of at least one dispersing agent for said asbestos and/or silica.

4. A method according to claim 1 wherein component (1) is present in amounts of from about 1 to 4.5 pounds per barrel.

5. A method according to claim 1 wherein said asbestos is subdivided so as to substantially all pass a 16 mesh sieve and said silica is subdivided so as to substantially all pass a 325 mesh sieve.

6. A method according to claim 1 wherein component (1) is asbestos present in an amount of from 1 to 4.5 pounds per barrel and subdivided to substantially all pass a 16 mesh sieve, and component (3) is substantially diesel oil.

7. A method according to claim 6 wherein there is additionally present an effective dispersing amount of at least one dispersing agent.

8. A method according to claim 1 wherein component (1) is silica present in an amount of from 1 to 4.5 pounds per barrel and subdivided to substantially all pass a 325 mesh sieve, and component (3) is substantially diesel oil.

* * * * *